United States Patent
Doar et al.

(10) Patent No.: US 10,216,505 B2
(45) Date of Patent: Feb. 26, 2019

(54) USING MACHINE LEARNING TO OPTIMIZE MINIMAL SETS OF AN APPLICATION

(71) Applicant: VMware, Inc., Palo Alto, CA (US)

(72) Inventors: Chen Doar, Herzliya (IL); Rami Stern, Herzliya (IL); Shadi Massalha, Herzliya (IL); Or Lupovitz, Herzliya (IL); Ehud Sicron, Herzliya (IL)

(73) Assignee: VMware, Inc., Palo Alto, CA (US)

( * ) Notice: Subject to any disclaimer, the term of this patent is extended or adjusted under 35 U.S.C. 154(b) by 17 days.

(21) Appl. No.: 15/249,038

(22) Filed: Aug. 26, 2016

(65) Prior Publication Data

US 2018/0060052 A1 Mar. 1, 2018

(51) Int. Cl.
*G06F 8/61* (2018.01)
*H04L 29/08* (2006.01)
*G06N 99/00* (2019.01)

(52) U.S. Cl.
CPC .............. *G06F 8/61* (2013.01); *G06N 99/005* (2013.01); *H04L 67/306* (2013.01); *H04L 67/34* (2013.01)

(58) Field of Classification Search
CPC ........................................................ G06F 8/61
USPC ....................................................... 717/178
See application file for complete search history.

(56) References Cited

U.S. PATENT DOCUMENTS

| | | | |
|---|---|---|---|
| 2003/0163807 A1* | 8/2003 | Drake .................. | G06F 8/61 717/174 |
| 2005/0289538 A1* | 12/2005 | Black-Ziegelbein ..... | G06F 8/61 717/177 |
| 2009/0228669 A1* | 9/2009 | Slesarev ............... | G06F 3/0605 711/161 |
| 2013/0151453 A1* | 6/2013 | Bhanot .................. | G06N 5/02 706/46 |
| 2015/0007165 A1* | 1/2015 | Zhao .................... | G06F 8/61 717/174 |
| 2016/0357544 A1* | 12/2016 | Lewallen .......... | G06F 17/30598 |

OTHER PUBLICATIONS

Povilas Kanapickas; "Mastering On-Demand Resources for Apple Platforms"; Unity Blogs website (blogs.unity3d.com); Nov. 26, 2015.*
Povilas Kanapickas; "Optimizing iOS App Size with Resource Slicing"; Unity Blogs website (blogs.unity3d.com); Dec. 28, 2015.*
Arun Kumar; "Remove Unwanted Windows Programs, Apps, Features and Folders"; Aug. 5, 2015.*

(Continued)

*Primary Examiner* — Qing Chen
*Assistant Examiner* — Clint Thatcher (57) ABSTRACT

Described embodiments provide ways to optimize application minimal sets based on the behavior of users. Described embodiments further provide ways to produce a minimal set that is optimized based on various attributes regarding the target endpoint onto which the minimal set is to be deployed, such as the target endpoint's operating system, applications installed on the target endpoint, hardware on the target endpoint, or profile information regarding the target endpoint's user. Also, described embodiments provide ways to prioritize the order of deployment when multiple minimal sets for various applications are downloaded to a target endpoint.

20 Claims, 4 Drawing Sheets

(56) References Cited

OTHER PUBLICATIONS

Ancy Dow; "Top Takeaways for Retail from VMworld"—VMware End-User Computing Blog; https://blogs.vmware.com/euc/2015/09/top-takeaways-for-retail-from-vmworld.html; Sep. 15, 2015; retrieved on Aug. 25, 2016.
Dan Graziano; "AT&T LTE network tops speed test, but Verizon still has the best LTE coverage"—BGR.com; http://bgr.com/2013/03/11/4g-network-speeds-368339/; Mar. 11, 2013; retrieved on Aug. 25, 2016.
Peter Reinhardt; "What is the actual download size of an average app on iOS7"—Quora.com; https://www.quora.com/What-is-the-actual-download-size-of-an-average-app-on-iOS; Nov. 16, 2013; retrieved on Aug. 25, 2016.
Alexa Ray Corriea; "Xbox One will play games as they install, includes auto-resume feature"; http://www.polygon.com/2013/5/21/4352828/xbox-one-play-games-as-they-install-auto-resume-feature; May 21, 2013; retrieved on Aug. 25, 2016.

* cited by examiner

USING MACHINE LEARNING TO OPTIMIZE MINIMAL SETS OF AN APPLICATION

RELATED APPLICATIONS

This application is related to the following U.S. Patent Application, the disclosures of which is incorporated by reference herein in its entirety:

U.S. patent application Ser. No. 15/178,540, entitled "CAPTURING AND DEPLOYING APPLICATIONS USING MAXIMAL AND MINIMAL SETS" by Nir Adler et al., filed on Jun. 9, 2016.

TECHNICAL FIELD

The present disclosure generally relates to techniques for delivering applications to computing devices and more specifically to using machine learning techniques to create optimized minimal sets of application components that can be executed on a device.

BACKGROUND

In today's world, an increasing number of application installations are performed by downloading an installation package to the computing device over a network connection, instead of transferring the software on a storage device, such as a compact disk, as done historically. The convenience of simply downloading an application over a network connection without having to deal with handling a physical storage medium makes this approach immeasurably more preferable for consumers and information technology (IT) departments of organizations alike. However, as the size of the average application grows, transferring an application's files to a computing device over a network connection in an acceptably short amount of time is becoming more and more challenging. To compound these difficulties, a rapidly increasing number of devices are relying on wireless networking as the primary mode of connectivity, which can exhibit significant bandwidth limitations.

For example, a program like Microsoft Office, available from Microsoft Corporation, can contain over 2 GB of data. Downloading 2 GB over the internet using a standard connection can take many hours, which is generally not acceptable both to users and to IT departments of organizations. To address this issue, an application's minimal set can be delivered instead, which is a relatively small subset of the application files that are sufficient to launch the application and allow a user to start using it, generally with limited functionality. With this approach, the minimal set can be downloaded to a computing device quickly, because it is small, and a user can begin using the application while the remaining files of the application are downloaded in the background over time.

However, numerous issues still remain. For example, existing approaches for producing minimal sets for applications generally attempt to predict which components of an application are necessary to launch the application and to enable the most needed basic features for the user. In the real world, however, the minimum set might be missing some features that are most useful or even critical for users and other included features might be entirely unnecessary and hence take up valuable space in the minimal set while providing little value. Further, because different types of users in an organization may utilize applications in different ways, a particular minimal set may be adequate for some groups of users while being inadequate for other groups.

A more efficient approach is desirable for managing minimal sets in enterprise environments.

DETAILED DESCRIPTION

Systems and methods in accordance with various embodiments of the present disclosure overcome at least some of the above mentioned shortcomings and deficiencies by providing more efficient ways to manage application minimal sets in enterprise environments. In particular, embodiments described herein provide ways to utilize machine learning in order to optimize application minimal sets based on the behavior of users. Described embodiments further provide ways to produce a minimal set that is optimized based on various attributes regarding the target endpoint onto which the minimal set is to be deployed, such as the target endpoint's operating system, applications installed on the target endpoint, hardware on the target endpoint, or profile information regarding the target endpoint's user. Also, described embodiments provide ways to prioritize the order of deployment when multiple minimal sets for various applications are downloaded to a target endpoint.

The process may begin by producing or obtaining an initial minimal set of application components. As used throughout this disclosure a "minimal set" or "minimal subset" is a subset of all application components that is sufficient for the application to be launched and run, generally with limited functionality. The minimal subset of an application enables a portion of the functionality of an application to be executed, however it does not include all of the components of the application necessary to enable a full set of features of the application. The initial minimal set can be delivered by a server to an endpoint device and the application can be launched from the initial minimal set on the endpoint. After the application begins executing and for a defined period of time thereafter, an agent implementing a driver on the endpoint device monitors and records all accesses (requests or calls) being made by the application to application components, which can be any files, registry entries, or other portions of the application. The recording process can be repeated every time the application is launched on the endpoint device to produce several recordings. The agent can then compare the initial minimal set that it received from the server to the recordings and identify which components of the initial minimal set are not in use (or are not used frequently enough) and which are used frequently enough to justify their inclusion in the minimal set, and update the server so that an optimized minimal set is produced on the server for future deployments.

In various embodiments, an optimized minimal set for an application can be produced based on various endpoint attributes. Namely, a different optimized minimal set can be produced for an application depending on certain desired attributes corresponding to the endpoint devices on which the optimized minimal set is intended to be deployed. Such attributes can include, for example, the operating system of the endpoint, software installed on the endpoint, hardware of the endpoint, or certain information obtained from the profile of a user to whom the endpoint is assigned. To produce such an optimized minimal set, one or more attributes are selected and recordings are collected from executions of the application on endpoints having the one or more attributes. The recordings are then used to produce an optimized minimal set. Subsequently, the optimized minimal set can be used to deploy the application on endpoints for which the attributes were selected. As a result, a minimal set can be developed that is better catered to a particular endpoint device or the user of the device. For example, an optimized minimal set may be developed based on the attribute of an endpoint's user profile indicating that the user is an engineer. In this case, recordings from other "engineer" endpoints can be used to produce the optimized minimal set. Because engineers might be different from other users in how they use the application, the minimal set may be better suited to be deployed on an engineer's endpoint than a minimal set that was optimized based on a more generic group of endpoints.

Further, described embodiments provide ways to prioritize the order of deployment of minimal sets when numerous minimal sets are deployed to a target endpoint. Generally, an endpoint can be assigned multiple applications (and hence multiple minimal sets) at once. Ideally, minimal sets for applications that are most likely to be used on the endpoint should be downloaded first, so that the user can get access to the most used applications first. In various embodiments, recordings can be made on endpoints to track the order in which the applications are accessed by users. The recordings can then be used to prioritize the order in which minimal sets for multiple applications are deployed to endpoints in the future. Similar to the attribute-specific minimal sets described above, different prioritization orders can be developed based on various endpoint and user attributes.

As previously mentioned, the process of optimizing a minimal set may begin by producing or obtaining an initial minimal set of application components and then recording application execution on a number of endpoint devices to which the initial minimal set has been delivered. Various methods are available for producing an initial minimal set.

One method for producing an initial minimal set is by performing a static analysis of the system to identify all components of an application and then selecting a subset of those components that are necessary to enable some basic functionality of the application. The static analysis can be performed on a computing device that has the application installed thereon. Conventionally, an application contains several types of files, for example:

execution files (.exe, .dll, .tlb, etc.), which are the files that contain the actual compiled code of the application;

resource files (.jpg, .avi, etc.), which are files such as images and videos the application uses;

configuration files (.txt, .ini, .config), which are usually text files and files storing the configuration data of the application, which are usually required at least in the bootstrap process of the application;

registry data, such as the Windows registry keys in a Windows system; and other.

In order for the application to consume compiled code files such as dynamically linked libraries (DLLs), the application must declare them, either by using the .dll file as a string inside the actual code or some other form of identification (e.g. COM guid). Looking at the PE header of an executable file (.exe), one can see a list of all the statically binded DLLs used by the application. By scanning the rest of the file for embedded strings and using simple heuristics to identify file names, the vast majority of files used by the application can be located. Running the same code recursively on the dependent code files, most of the files used by the application can be identified. The process of identifying all of the files of the application in this manner is referred to as the static analysis of the system.

To produce an initial minimal subset of all application files, a dynamic approach to record on-demand requests by the application can be used. In this approach, an application can be launched on an endpoint device from a minimal component (such as a desktop shortcut), while the remainder of the application's contents reside on the server. A driver (e.g., a Windows mini filter driver), on the endpoint device can implement the following flow:

catch any file request being made to the file-system;

if the file does not exist on the endpoint device, download the file from the server;

resume the file-system operation after the download completes.

In this way, the application can be delivered as a chained list of on demand requests one after the other. The problem with delivering entire applications using this approach is, however, that even for applications with a small footprint, stopping each request to the file-system, asking the server if it has the file, validating the signatures to make sure the file is valid, performing the hypertext transfer protocol (HTTP) download via the server, etc., consumes a significant amount of time. So, while using the on-demand approach would allow a user to start using the application before all the files are downloaded, it can still result in substantially hindered user experience because application content needs to constantly be downloaded from the server. For this reason, it is more advantageous to deliver a minimal subset of application files first, and then only deliver the remaining files on-demand, as the file system needs them.

To determine which files should be delivered in the minimal set, the driver can record a list of file requests observed during the initial execution of the application. The assumption is that when an application is first launched, a sequence of files will be loaded and this sequence of files are the necessary files to enable the basic execution of the application. In other words, when an application is launched, a typical flow of requests is started, which may be the shortcut being accessed that points to the binary executable file, where the binary executable file in turn issues requests to access several dynamically linked libraries (DLLs), and so on. For example, when accessing the Microsoft Word application, the desktop shortcut might be accessed first, which points to the file "winword.exe", which in turn loads "MSO.dll" and "OART.dll" and so on. In order to identify which files are loaded first and therefore should be included in the minimal subset, the application may be executed for a predetermined period of time while recording the sequence of file access requests. Typically, after some period of time from loading the application, it stops requesting files from the file system even though not all files have been requested yet. At this time, the recording may be stopped and the files which had been requested from the file system during this time can be added to the minimal set.

In some cases, particularly with complex applications, an application performs a check of files to validate that the files exist, even when the application isn't using the file. This can create issues when working with minimal sets as a number of files may not be present on the endpoint. In various embodiments, to overcome this, file stubs can be created for all application files and delivered along with the minimal set so that it appears to the application that all files are present. As a result of including these stub files with the minimal set, any validation checks by the application are successful and the application is able to load and execute. The file stubs can remain until the actual files are downloaded to the endpoint (e.g. either as an on-going background process or on-demand when the user subsequently requests them).

In some alternative embodiments, a minimal set (both an initial minimal set and an optimized minimal set) can be based on blocks rather than files. This can help reduce the size of the minimal set because only blocks of file data may be included in the minimal set instead of entire files. Hence, in various embodiments, a "component" of an application, as used herein, may refer to a block of application data as well as to a file or other portion of the application.

Figure 1:
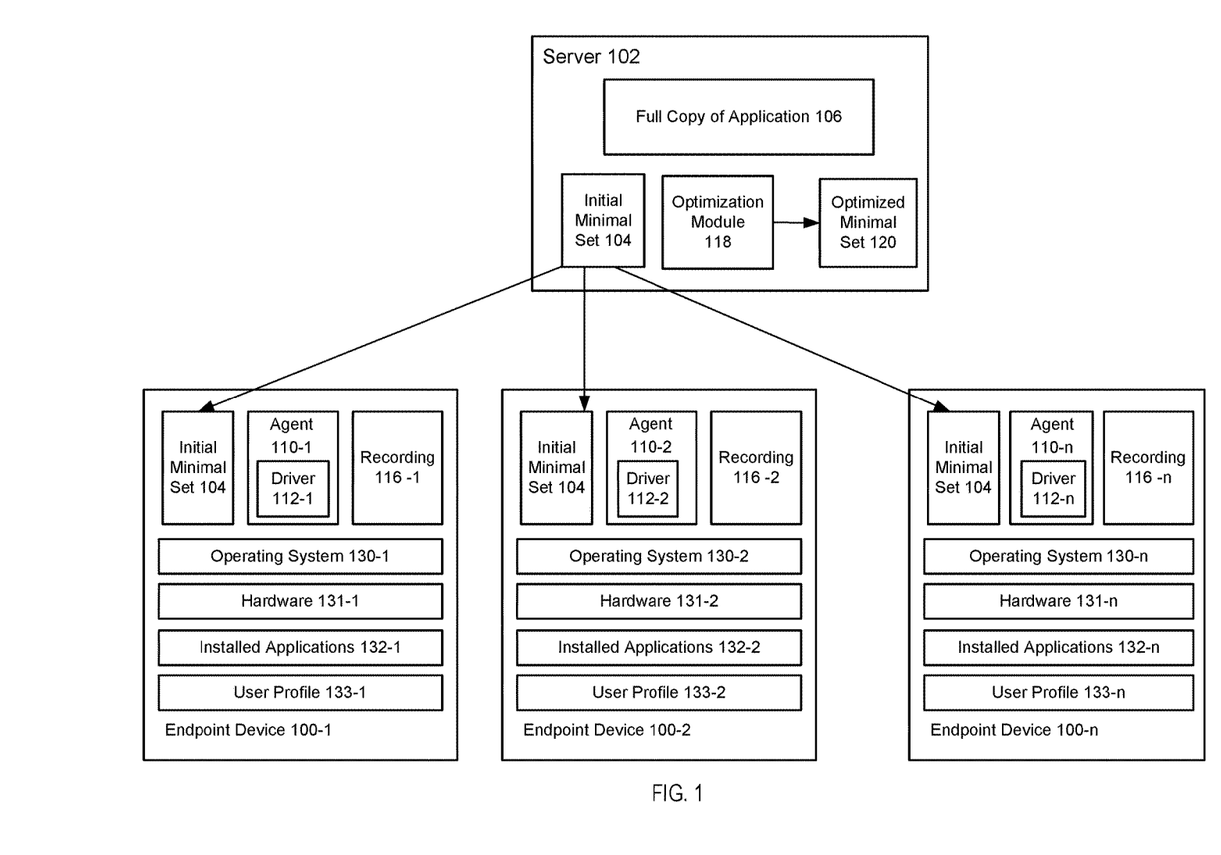
FIG. 1 illustrates an example of a system for developing optimized minimal sets for applications, in accordance with various embodiments.

FIG. 1 illustrates an example of a system for developing optimized minimal sets for applications, in accordance with various embodiments. As illustrated in the example of FIG. 1, a server 102 contains an initial minimal set 104 of an application's components. A full copy 106 of the application 106 is also present on the server 102. In an embodiment, the full copy of the application 106 may be contained in a backup database on the server 102 as part of the backup data of an endpoint on the network containing the application.

For example, the server 102 may be a central management server in an enterprise. An IT department can manage a plurality of endpoints (100-1, 100-2, through 100-n) in the enterprise over a network, via the server 102. In various embodiments, the initial minimal set 104 may be created by an administrator, e.g., by performing a statistical analysis on the application 106 and recording the request chain when launching the application, as described above. As will be appreciated by one skilled in the art, a typical enterprise environment can contain hundreds or thousands of endpoints and the example of FIG. 1 only illustrates three endpoints for the sake of being concise.

The initial minimal set 104 can be distributed by the server 102 to endpoint 100-1. In various embodiments, an agent 110-1 operating on the endpoint 100-1 can download the initial minimal set 104. Once the initial minimal set 104 is deployed on the endpoint 100-1, the application can be launched from the initial minimal set 104. For example, the application may be launched when a user opens the application on the endpoint 100-1 to use the application.

After execution of the application is detected on the endpoint 100-1, a filter driver 112-1 operating as part of the agent 110-1 monitors all accesses (requests or calls) made by the application to application components. As described above, an application component can be any portion of the application. For example, application components can be application files or, in some embodiments, application components can be blocks of data. The driver 112-1 monitors all such accesses and stores information regarding each access in a recording 116-1. For example, the recording 116-1 can identify the component being accessed as well as the time of each access (e.g., a time stamp).

When a component that is being accessed is located in the initial minimal set 104 on the endpoint 100-1, the driver 112-1 makes a recording of the access and the application continues to execute having access to the component. When a component that is being accessed is not located in the initial minimal set 104 on the endpoint 100-1, the driver 112-1 makes a recording of the access and requests the component from the server 102. The execution of the application is then suspended until the component is retrieved in the server 102 from the application 106 and downloaded by the endpoint 100-1. Once the missing component is downloaded, the application can resume executing on the endpoint 100-1, now having access to the component. In this way, the application can continue to execute on the endpoint 100-1 and, if any components required by the application are not available on the endpoint 100-1, the application can be suspended while the component is delivered on demand. Meanwhile, the agent 110-1 records all accesses made by the application to components contained in the initial minimal set 104 as well as to components not contained in the initial minimal set 104. As a result, the recording 116-1 indicates which components (located both in the initial minimal set and outside of it) were accessed by the application.

The process of generating the recording 116-1 can continue until a triggering event for stopping the process takes place. For example, a triggering event may be that a predetermined amount of time has passed since the application has begun executing or, in another embodiment, a triggering event may be that a given period of time has passed since the initial minimal set 104 was deployed on the endpoint 100-1.

In various embodiments, the agent 110-1 can then compare the recording 116-1 with the initial minimal set 104 it received from the server and identify how the initial minimal set can be optimized. For example, the agent 110-1 can determine which components (e.g., blocks or files) of the initial minimal set 104 were not accessed and so should be removed from the initial minimal set 104. The agent 110-1 can also determine which components (e.g., blocks or files) that are not included in the initial minimal set 104 were accessed and should be added to the initial minimal set 104. This information can be sent to the server 102, where it can be analyzed by an optimization module 118. Based on the information, the optimization module 118 can produce an optimized minimal set 120, which can be used in future deployments of the application. In an embodiment, the recording 116-1 itself can be sent to the server 102 and the optimization module 118 (instead of the agent 110-1) can perform the steps of comparing the recording 116-1 to the initial minimal set 104 to identify how the initial minimal set 104 can be optimized. In various embodiments, additional criteria, such as the timing of accesses (e.g., time stamps) can be taken into account by the agent 110-1 and/or optimization module 118 when producing an optimized minimal set 120.

In various embodiments, a new recording 116-1 can be produced every time a user launches or uses the application. In another embodiment, a recording 116-1 can be produced at certain intervals or periodically, e.g., once out of every certain number of times that a user uses the application. For example, the next time the user launches the application on the endpoint 100-1, and every time thereafter, the agent 110-1 can again record each access made by the application on the endpoint 100-1. Notably, in subsequent executions of the application on the endpoint 100-1, fewer, if any, requests to the server 102 for missing application components may be required as those components may have already been downloaded to the endpoint 100-1.

When several recordings (e.g., 116-1) have been produced and stored, the agent 110-1 can compare a recording 116-1 with the initial minimal set 104 and to previous recordings and identify how the initial minimal set 104 can be optimized. For example, the agent 110-1 can determine which components (e.g., blocks, files) of the initial minimal set 104 were not accessed in the recordings (or were accessed infrequently, i.e., less frequently than a certain threshold) and so should be removed from the initial minimal set 104. The agent 110-1 can also determine which components (e.g., blocks or files) that are not included in the initial minimal set 104 were accessed in the recordings (or were accessed sufficiently frequently, i.e., more frequent than a certain threshold) and should be added to the initial minimal set 104. This information can be sent to the server 102, where it can be analyzed by an optimization module 118. Based on the information, the optimization module 118 can produce an optimized minimal set 120, which can be used in future deployments of the application. In an embodiment, the recording 116-1 itself along with previous recordings can be sent to the server 102 and the optimization module 118 (instead of the agent 110-1) can perform the steps of comparing the recording 116-1 and previous recordings to the initial minimal set 104 to identify how the initial minimal set 104 can be optimized.

In various embodiments, additional criteria, such as the timing of accesses (time stamps) can be taken into account by the agent 110-1 and/or optimization module 118 when producing an optimized minimal set 120.

Hence, over time, as more recordings (e.g., 116-1) are produced by the endpoint 100-1 and compared with the initial minimal set 104, a better, more precise optimized minimal-set 120 can be developed for the application.

In various embodiments, the minimal set 104 can be deployed to several endpoints (e.g., 100-1, 100-2, 100-*n*) and a recording (e.g., 116-1, 116-2, 116-*n*) can be gathered from each endpoint (e.g., 100-1, 100-2, 100-*n*) in the same way as described above with respect to endpoint 100-1 via a corresponding agent 110-2 and driver 112-2 on endpoint 100-2 and a corresponding agent 110-*n* and driver 112-*n* on endpoint 100-*n*. Also, past recordings can be gathered from each endpoint (100-1, 100-2, 100-*n*). The recordings can then be analyzed in the manner described above (e.g., by the optimization module 118) to produce the optimized minimal set 120.

For example, the optimization module 118 can analyze the recordings (e.g., 116-1, 116-2, 116-*n*) produced on each endpoint to determine which components in the initial minimal set 104 should not be there and which components should be added. In an embodiment, the optimization module 118 can analyze several recordings from each endpoint (e.g., 100-1, 100-2, 100-*n*) (e.g., including past recordings) to determine which components in the initial minimal set 104 should not be there and which components should be added.

Various algorithms can be implemented for producing the optimized minimal set 120 based on the set of recordings. For example, if there are components that are never or seldom requested by the endpoints (e.g., 100-1, 100-2, 100-*n*) in the recordings, then those components may be removed from the initial minimal set 104 (if the components are part of the initial minimal set 104) or not added to the initial minimal set (if the components are not part of the initial minimal set 104). For example, the boundaries can be defined by a predetermined threshold amount so that any component that is accessed by fewer than a certain proportion of the endpoints or recordings (e.g., 1%, 2%, etc.) is either removed from the initial minimal set (if the component is part of the initial minimal set 104) or not added to the initial minimal set 104 (if the component is not part of the initial minimal set 104). Further, the boundaries can include a time frame so that any component that is accessed by fewer than a certain proportion of the endpoints or recordings (e.g., 1%, 2%, etc.) during a certain time period (e.g., during the first 30 minutes of execution) is either removed from the initial minimal set 104 (if the component is part of the initial minimal set) or not added to the initial minimal set 104 (if the component is not part of the initial minimal set). In various embodiments, once the components to be removed from the initial minimal set 104 are identified, as described above, all remaining components that are accessed in the recordings that are not already part of the initial minimal set 104 can be added to the initial minimal set 104.

In various embodiments, if there are components that are always or often requested by the endpoints (100-1, 100-2, 100-*n*) in the recordings, then those components may be added to the initial minimal set 104 (if not already part of the initial minimal set 104) or left to remain in the initial minimal set 104 (if already part of the initial minimal set 104). For example, the boundaries can be defined by a predetermined threshold amount so that any component that is accessed by more than a certain proportion of endpoints or recordings (e.g., 1%, 2%, etc.) is added to the initial minimal set 104 (if not already part of the initial minimal set 104) or left to remain in the initial minimal set 104 (if already part of the initial minimal set 104). Further, the boundaries can include a time frame so that any component that is accessed by more than a certain proportion of endpoints or recordings (e.g., 1%, 2%, etc.) during a certain time period (e.g., during the first 30 minutes of execution) is added to the initial minimal set 104 (if not already part of the initial minimal set 104) or left to remain in the initial minimal 104 set (if already part of the initial minimal set 104). In various embodiments, once the components to be added to or to remain in the initial minimal set 104 are identified, all remaining components can be removed from the initial minimal set 104.

As will be appreciated by those skilled in the art, various other approaches can be implemented for determining how to produce an optimized minimal set 120 based on the recordings (e.g., 116-1, 116-2, 116-*n*), including past recordings obtained from each endpoint (100-1, 100-2, 100-*n*), without straying from the spirit of the invention. For example, the approaches can take into account additional factors, such as the desired total size of the optimized minimal set 120, and so on.

Thus, because the optimized minimal set 120 is produced based on actual behavior of users, it is more likely to contain information that is pertinent to a user and less likely to contain information that is not, which can result in improved user experience with the application while improving the download time for the optimized minimal set 120 due to reduced size.

By performing the process for optimizing application minimal sets (e.g., 104), as described above, an organization is able to deploy a generic minimal set (the initial minimal set 104) to multiple endpoints and generate an improved minimal set (the optimized minimal set 120), which the organization can use in future deployments. The process can be ongoing or repeated periodically to fine-tune the optimized minimal set 120.

In various embodiments, an optimized minimal set 120 can be produced based on the environment or types of endpoints on which it will be deployed. For example, an optimized minimal set 120 may be produced based on various attributes regarding the target endpoint on which the minimal set 120 is to be deployed, such as the target endpoint's operating system, applications installed on the target endpoint, hardware of the target endpoint, or profile information regarding the target endpoint's user. In various embodiments, one or more attributes can be selected (without identifying a target endpoint) and an optimized minimal set 120 can be developed based on the selected attributes. The optimized minimal set 120 can be stored in a minimal set catalog on the server 102. Then, when an endpoint matching the selected attribute requests the application, the optimized minimal set 120 can be delivered to the endpoint.

For example, because an attribute related to an endpoint (e.g., 100-1, 100-2, 100-*n*) may affect the way applications are used on the endpoint, it may be advantageous when producing an optimized minimal set 120 for the particular endpoint (e.g., 100-1, 100-2, 100-*n*) to use recordings (e.g., 116-1, 116-2, 116-*n*) generated by other endpoints that share the attribute. For example, because engineers may use applications in similar ways to other engineers, it may be beneficial when producing an optimized minimal set 120 that will be deployed on other engineers' endpoints to use recordings (e.g., 116-1, 116-2, 116-*n*) that were generated on endpoints used by engineers. Similarly, it may make sense to use recordings (e.g., 116-1, 116-2, 116-*n*) gathered from endpoints sharing other attributes, such as operating system type, hardware type, installed applications, user profile information, etc., to produce optimized minimal sets (e.g., 120) that will be deployed on endpoints that have the same attribute or attributes.

For purposes of clarity, it should be mentioned that a network would generally contain a large numbers of endpoints, not all of which may contain the application for which the optimized minimal set is developed. Hence, when selecting endpoints from which recordings will be gathered, the system can identify endpoints on the network having the application installed that also match any required attributes. Furthermore, even though the endpoints in FIG. 1 (100-1, 100-2, 100-*n*) are illustrated containing an initial minimal set 104, it should be understood that in order to produce a recording of an application's execution, it can be sufficient if the endpoint contains the application without containing a separate minimal set (e.g., 104).

In various embodiments, when a recording (e.g., 116-1, 116-2, 116-*n*) is produced from an endpoint (100-1, 100-2, 100-*n*), the recording can be stored and various attributes related to the recorded endpoint (100-1, 100-2, 100-*n*) can be stored along with the recording. Such attributes can include, for example, what operating system 130-1, 130-2, 130-*n* is running on the endpoint, what hardware is on the endpoint 131-1, 131-2, 131-*n*, what other software applications 132-1, 132-2, 132-*n* are installed on the endpoint, and various information obtained from the profile of a user 133-1, 133-2, 133-*n* to whom the endpoint is assigned. Such profile information 133-1, 133-2, 133-*n* can include, for example, the user's organizational unit, such as marketing, engineering, sales, accounting, etc. (e.g., all users in marketing might use animations in PowerPoint, but not users in accounting); the user's rank, such as executive, management, developers, etc. (e.g., managers use Outlook more intensely than developers); or the user's age (e.g., young users may explore and use more features thus requiring a more demanding minimal set). In an embodiment, such profile information 133-1, 133-2, 133-*n* may be stored in a central user profile database on the server 102.

Consequently, an optimized minimal set 120 can be created based on one or more identified or selected desired attributes. Once the desired attributes are identified or selected, recordings (e.g., 116-1, 116-2, 116-*n*) of the application's execution, as described above, can be retrieved that were produced on endpoints (e.g., 100-1, 100-2, 100-*n*) having the identified attributes. For example, if the desired attribute is a particular type of operating system, then recordings of the application executing on endpoints running on the same operating system can be retrieved. Or, if the desired attribute is a user from the marketing organizational unit, then recordings of the application executing on endpoints that are assigned to users in the marketing organization unit can be retrieved. Consequently, the retrieved recordings can be analyzed according to the methods described above for producing an optimized minimal set 120 based on recordings obtained from multiple endpoints, to produce an optimized minimal set 120 for the selected attribute(s). For example, the optimization module 118 in the server 102 can analyze the recordings (e.g., 116-1, 116-2, 116-*n*) to determine which components in the initial minimal set 104 should not be there and which components should be added, based on the recorded accesses in the recordings, in order to produce the optimized minimal set 120. In various embodiments, the analyzed recordings can also include past recordings from each endpoint.

As mentioned, an attribute for producing an optimized minimal set 120 may be the software applications 132-1, 132-2, 132-3 installed on an endpoint. Namely, in an embodiment, the system can type-cast endpoints (e.g., 100-1, 100-2, 100-*n*) for which recordings are retrieved based on the software installed (132-1, 132-2, 132-*n*) on the endpoints. For example, an end-point with many developer tools installed would most likely not use applications such as PowerPoint, so the minimal set could be set to no files or blocks at all. On the other hand, a web-developer endpoint may require a substantially more Chrome feature-rich minimal set as it would likely use its more advanced debugging capabilities. For example, to produce an optimized minimal set 120 based on the attribute of certain software applications being present on the endpoint, recordings can be collected from endpoints having the certain software applications installed.

In various embodiments, when an application minimal set is requested (e.g., by an administrator or by a user of the endpoint) for installing the application on a particular target endpoint, the system can analyze attributes related to the endpoint and identify one or more attributes for producing an optimized minimal set e.g., 120. For example, the system can contain logic that allows it to determine, for any given endpoint, which attributes related to the endpoint, if any, should determine the optimized minimal set 120 that the endpoint will receive. The identified attributes can then be used to retrieve recordings from endpoints having the same attributes and the optimized minimal set 120 can be produced based on the retrieved recordings. In another embodiment, the system can store numerous optimized minimal sets e.g., 120 corresponding to different endpoint attributes in a catalog and the system can select an optimal minimal set from the stored attributes that best matches the attributes of the target endpoint.

In various embodiments, the system can prioritize the order of minimal set deployment when multiple application minimal sets are delivered to a target endpoint. In many cases, a managed endpoint gets assigned several applications at once. For example, well over ten applications may be assigned when provisioning a new device or after an operating system upgrade. In this situation, even when implementing optimized minimal sets for installing applications, the data transfer can require a significant amount of time. To address this issue, embodiments implement techniques to prioritize the order of downloads of minimal sets to the endpoint, e.g., so that the most important applications are deployed first.

In various embodiments, to prioritize the order of minimal set downloads for a certain set of applications to a target endpoint, the system records (e.g., via an agent 110-1) in what order the applications are used on endpoints (e.g., 100-1, 100-2, 100-*n*). Preferably, each of the recorded endpoints would contain all the applications for which the prioritized order is being determined. In an embodiment, a recording can be made when a user is first assigned an endpoint containing the set of applications. In another embodiment, a recording can be made when a user begins using an endpoint after the set of applications is delivered to the endpoint. In another embodiment, the recording can be made when a user logs into a machine containing the set of applications. Based on the recorded order in which users use the applications, the system can then determine a prioritized order for deploying minimal sets for the applications to the target endpoint, for example, such that the minimal set for the application most often used first according to the recordings is downloaded first, and so on.

Endpoint attributes can be used in this context similarly to how they are used for optimized minimal set (e.g., 120) creation, such that the determined prioritized order of minimal set downloads is based on certain endpoint attributes. Further, separate queues can be implemented so that the most important applications are completely downloaded before other downloads begin. For example, so that a manager's endpoint would download Microsoft Outlook first and other less relevant applications later.

For example, to determine a prioritized download order for a particular attribute(s), the attribute(s) can be identified and recordings of the order in which applications are used on endpoints (as described above) can be retrieved from endpoints having the selected attribute(s). Those recordings can then be used to determine a download prioritization order for the selected attribute(s). In various embodiments, the same endpoint attributes as described above can be used in this context (operating system, installed applications, hardware, user profile information).

Figure 2:
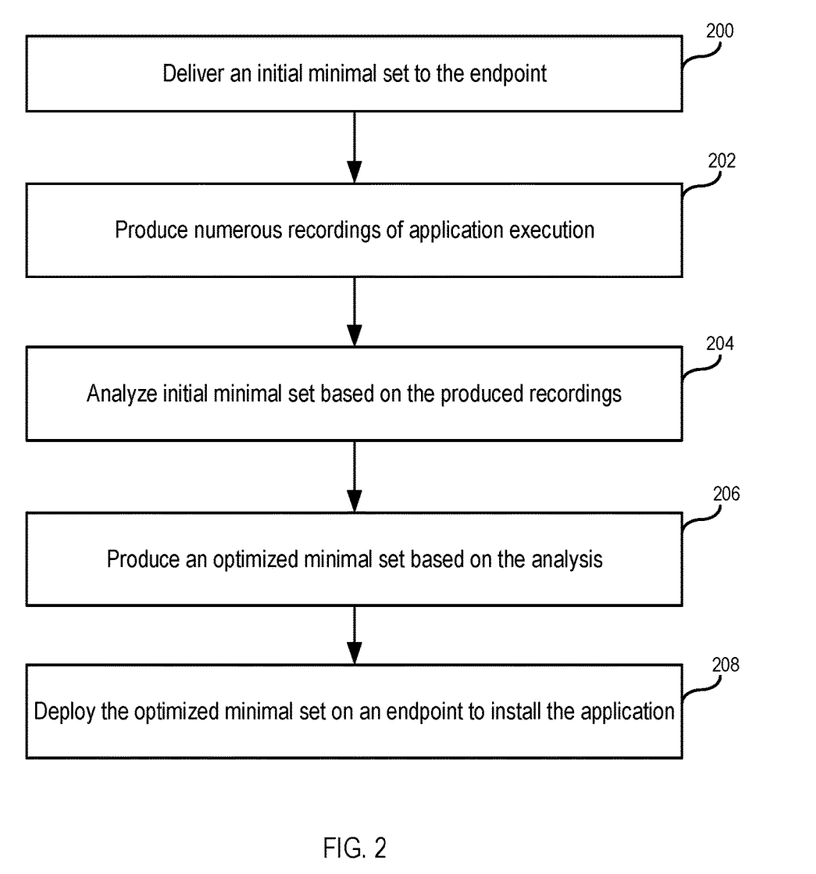
FIG. 2 illustrates an example process flow for producing an optimized minimal set based on recordings of an application executing on an endpoint, in accordance with various embodiments.

FIG. 2 illustrates an example process flow for producing an optimized minimal set based on recordings of an application executing on an endpoint, in accordance with various embodiments. In operation 200, an initial minimal set is delivered to the endpoint. For example, the initial minimal set can be delivered from a server. In operation 202, numerous recordings of application execution are produced. For example, the system can detect when the application is launched from the minimal set on the endpoint and each time it is launched subsequently. Each time the application detects an application launch, it can record, for a predetermined period of time, all accesses made by the application to application components, and store the information in a separate recording for every execution of the application. In operation 204, the initial minimal set is analyzed based on the produced recordings. For example, an agent on the endpoint can perform the analysis to determine what components should be added to the initial minimal set (e.g., because those components were accessed sufficiently often in the recordings) and what components should be removed from the initial minimal set (e.g., because those components were not accessed sufficiently often in the recordings). In operation 206, an optimized minimal set is produced based on the analysis. For example, the endpoint can request the server to update the initial minimal set on the server based on the analysis performed in step 204. In operation 208, the optimized minimal set is deployed on an endpoint to install the application.

Figure 3:
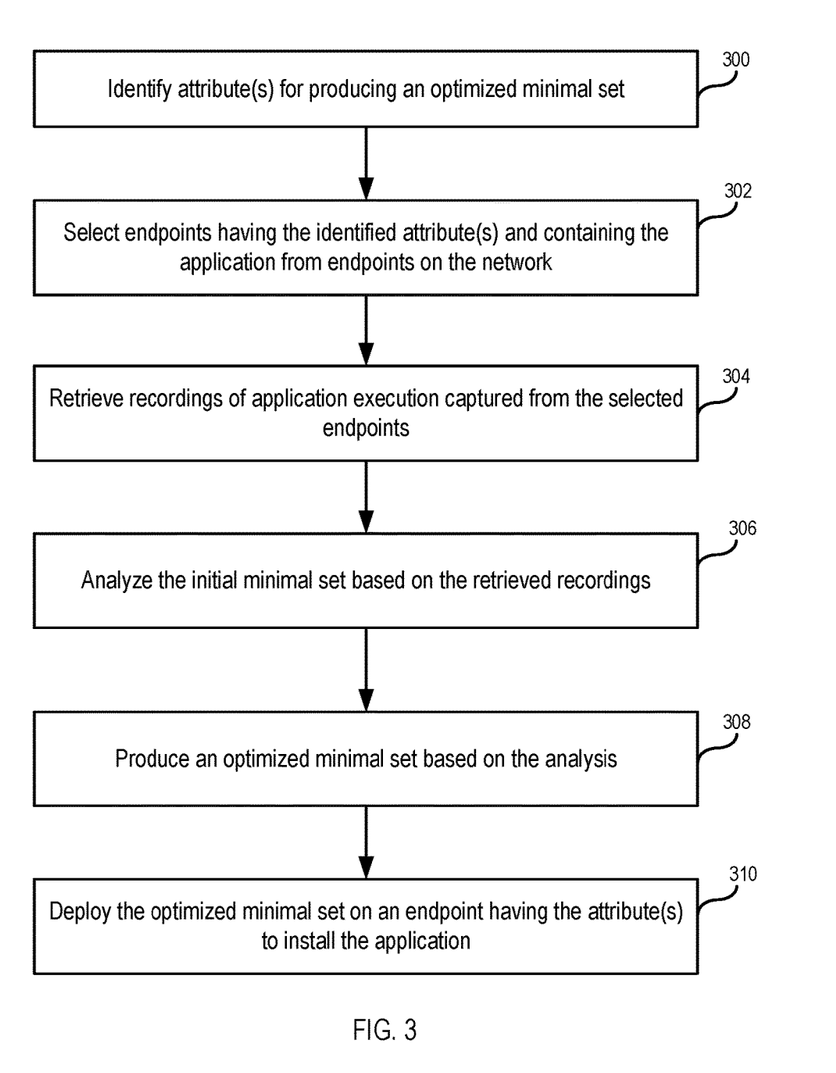
FIG. 3 illustrates an example process flow for producing an optimized minimal set based on identified attributes, in accordance with various embodiments.

FIG. 3 illustrates an example process flow for producing an optimized minimal set based on identified attributes, in accordance with various embodiments. In operation 300, attribute(s) are identified for producing an optimized minimal set. As discussed above, an attribute can include, for example, endpoint operating system, installed applications, hardware, or assigned user profile. For example, the attribute(s) can be selected in order to produce an optimized minimal set for installing the application on a target endpoint having those attribute(s). In operation 302, endpoints having the identified attribute(s) and containing the application are selected from endpoints on the network. In operation 304, recordings of application execution captured from the selected endpoints are retrieved. For example, a single recording can be collected from each endpoint or multiple recordings can be collected from each endpoint. In various embodiments, the recordings can be obtained from a storage (either on the server or on each endpoint) containing stored recordings. Each stored recording can also store a list of attributes of the endpoint from which the recording is collected. As discussed above, each recording can be produced by detecting execution of the application on the endpoint and recording accesses made by the application during a predetermined period of time. In operation 306, the initial minimal set is analyzed based on the retrieved recordings. For example, an optimization module in the server can perform the analysis to determine what components should be added to the initial minimal set (e.g., because those components were accessed sufficiently often by endpoints in the recordings) and what components should be removed from the initial minimal set (e.g., because those components were not accessed sufficiently often by endpoints in the recordings). In operation 308, an optimized minimal set is produced based on the analysis. In operation 310, the optimized minimal set is deployed on an endpoint having the attribute(s) to install the application.

Figure 4:
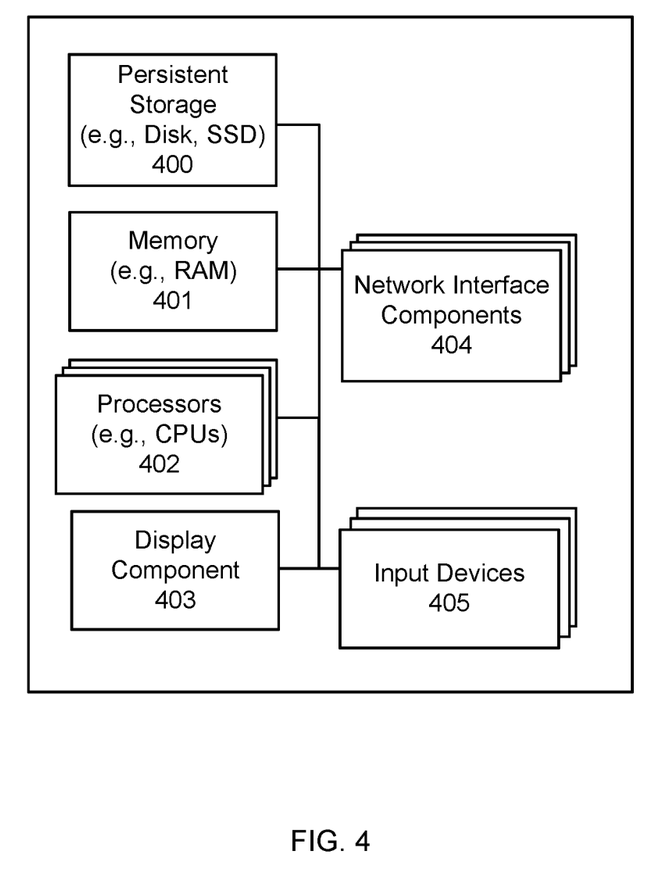
FIG. 4 illustrates an example of some general components of a computing device that can be utilized in conjunction with various embodiments described in the present specification.

FIG. 4 illustrates an example of some general components of a computing device that can be utilized in conjunction with various embodiments described in the present specification. In this particular example, the computing device includes one or more processors (e.g., central processing units (CPUs) 402 for executing instructions that can be stored in a storage medium. The storage medium may take the form of memory 401 (e.g., RAM), persistent storage 400 (e.g., disk, flash, SSD, etc.) or any combination thereof. As used herein, the terms "storage medium", "computer readable storage medium", and "non-transitory storage medium" are all used interchangeably and can include many different types of volatile memory or persistent storage, such as random access memory (RAM) storing program instructions for execution by the processor 402, a separate form of storage for images or data, a removable memory for sharing information with other devices and the like.

The computing device typically further comprises a display component 403, such as a computer monitor, a touch screen, liquid crystal display (LCD), light-emitting diode (LED) display, or the like. The display component 403 is conventionally used to display images or information to the user so that the user may interact with the computing device.

In various embodiments, the computing device will also include a set of input devices 405 capable of receiving input from a user. This input can include, for example, a conventional keyboard, a mouse, a button, a touch pad, a touch screen, or any other such component whereby a user can input a command to the device, provide information to the device or otherwise interact with the device. In some embodiments, the computing device can include one or more network interface components (NICs) 404 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method, comprising:
deploying, by a management server, an initial minimal set of application components stored on the management server to each endpoint device in a plurality of endpoint devices, wherein the initial minimal set comprises a subset of components of the application that enables a portion of functionality of the application to be executed without including all application components;
on each endpoint device in the plurality of endpoint devices,
detecting execution of the application from the initial minimal set;
during execution from the initial minimal set, recording by an agent operating on the endpoint device accesses made by the application to application components located in the initial minimal set on the endpoint device and to application components missing from the initial minimal set on the endpoint device, and storing the recordings;
selecting one or more endpoint devices in the plurality of endpoint devices;
retrieving the recordings of application accesses for the selected endpoint devices; and processing the retrieved recordings to produce an optimized minimal set on the management server based on recorded accesses to application components located in the initial minimal set on the endpoint device and to application components missing from the initial minimal set on the endpoint device in the retrieved recordings, wherein the optimized minimal set is produced by at least one of: removing one or more application components from the initial minimal set or adding one or more application components to the initial minimal set.

2. The method of claim 1, further comprising:
identifying a target endpoint device having one or more attributes that are also present on the selected one or more endpoint devices, the target endpoint not being included in the plurality of endpoint devices; and
deploying the optimized minimal set to the identified target endpoint device.

3. The method of claim 2, wherein an attribute comprises at least one of: an operating system installed on the target endpoint device, applications installed on the target endpoint device, hardware present in the target endpoint device, or profile information of a user to whom the target endpoint device is assigned.

4. The method of claim 3, wherein the profile information comprises at least one of: data indicating an organizational unit of the user, data indicating a rank of the user, or data indicating an age of the user.

5. The method of claim 1, wherein processing the retrieved recordings to produce an optimized minimal set further comprises:
removing components from the minimal set that are accessed by a proportion of the selected endpoints that is smaller than a first predefined threshold; and
adding components to the minimal set that are accessed by a proportion of the selected endpoints that is larger than a second predefined threshold.

6. The method of claim 1, wherein recording the accesses made by the application to application components is performed during a predefined period of time after the application is executed from the initial minimal set.

7. The method of claim 1, wherein an application component is at least one of: a file or a block.

8. A computing device, comprising:
at least one processor; and
memory including instructions that, when executed by the at least one processor, cause the computing device to perform the steps of:
deploying, by a management server, an initial minimal set of application components stored on the management server to each endpoint device in a plurality of endpoint devices, wherein the initial minimal set comprises a subset of components of the application that enables a portion of functionality of the application to be executed without including all application components;
on each endpoint device in the plurality of endpoint devices,
detecting execution of the application from the initial minimal set;
during execution from the initial minimal set, recording by an agent operating on the endpoint device accesses made by the application to application components located in the initial minimal set on the endpoint device and to application components missing from the initial minimal set on the endpoint device, and storing the recordings;
selecting one or more endpoint devices in the plurality of endpoint devices;
retrieving the recordings of application accesses for the selected endpoint devices; and
processing the retrieved recordings to produce an optimized minimal set on the management server based on recorded accesses to application components located in the initial minimal set on the endpoint device and to application components missing from the initial minimal set on the endpoint device in the retrieved recordings, wherein the optimized minimal set is produced by at least one of: removing one or more application components from the initial minimal set or adding one or more application components to the initial minimal set.

9. The computing device of claim 8, wherein the memory further includes instructions that when executed by the at least one processor, cause the computing device to perform the steps of:
identifying a target endpoint device having one or more attributes that are also present on the selected one or more endpoint devices, the target endpoint not being included in the plurality of endpoint devices; and
deploying the optimized minimal set to the identified target endpoint device.

10. The computing device of claim 9, wherein an attribute comprises at least one of: an operating system installed on the target endpoint device, applications installed on the target endpoint device, hardware present in the target endpoint device, or profile information of a user to whom the target endpoint device is assigned.

11. The computing device of claim 10, wherein the profile information comprises at least one of: data indicating an organizational unit of the user, data indicating a rank of the user, or data indicating an age of the user.

12. The computing device of claim 1, wherein processing the retrieved recordings to produce an optimized minimal set further comprises:
removing components from the minimal set that are accessed by a proportion of the selected endpoints that is smaller than a first predefined threshold; and
adding components to the minimal set that are accessed by a proportion of the selected endpoints that is larger than a second predefined threshold.

13. The computing device of claim 1, wherein recording the accesses made by the application to application components is performed during a predefined period of time after the application is executed from the initial minimal set.

14. The computing device of claim 1, wherein:
recording the accesses made by the application to application components includes recording a time of each access; and
producing the optimized minimal set is further based on the recorded times of the accesses.

15. A non-transitory computer readable storage medium comprising one or more sequences of instructions, the instructions when executed by one or more processors causing the one or more processors to execute the operations of:
deploying, by a management server, an initial minimal set of application components stored on the management server to each endpoint device in a plurality of endpoint devices, wherein the initial minimal set comprises a subset of components of the application that enables a portion of functionality of the application to be executed without including all application components;

on each endpoint device in the plurality of endpoint devices,
  detecting execution of the application from the initial minimal set;
  during execution from the initial minimal set, recording by an agent operating on the endpoint device accesses made by the application to application components located in the initial minimal set on the endpoint device and to application components missing from the initial minimal set on the endpoint device, and storing the recordings;
selecting one or more endpoint devices in the plurality of endpoint devices;
retrieving the recordings of application accesses for the selected endpoint devices; and
processing the retrieved recordings to produce an optimized minimal set on the management server based on recorded accesses to application components located in the initial minimal set on the endpoint device and to application components missing from the initial minimal set on the endpoint device in the retrieved recordings, wherein the optimized minimal set is produced by at least one of: removing one or more application components from the initial minimal set or adding one or more application components to the initial minimal set.

16. The non-transitory computer readable storage medium of claim 15, further comprising instructions that when executed by the one or more processors cause the one or more processors to execute the operations of:
  identifying a target endpoint device having one or more attributes that are also present on the selected one or more endpoint devices, the target endpoint not being included in the plurality of endpoint devices; and
  deploying the optimized minimal set to the identified target endpoint device.

17. The non-transitory computer readable storage medium of claim 16, wherein an attribute comprises at least one of: an operating system installed on the target endpoint device, applications installed on the target endpoint device, hardware present in the target endpoint device, or profile information of a user to whom the target endpoint device is assigned.

18. The non-transitory computer readable storage medium of claim 17, wherein the profile information comprises at least one of: data indicating an organizational unit of the user, data indicating a rank of the user, or data indicating an age of the user.

19. The non-transitory computer readable storage medium of claim 15, wherein processing the retrieved recordings to produce an optimized minimal set further comprises:
  removing components from the minimal set that are accessed by a proportion of the selected endpoints that is smaller than a first predefined threshold; and
  adding components to the minimal set that are accessed by a proportion of the selected endpoints that is larger than a second predefined threshold.

20. The non-transitory computer readable storage medium of claim 15, wherein recording the accesses made by the application to application components is performed during a predefined period of time after the application is executed from the initial minimal set.

* * * * *